3,052,012
METHODS OF MAKING CONTAMINANT-PROOF
ELECTRICAL CIRCUIT COMPONENTS
Leonard E. Ravich, Cleveland Heights, Ohio
(195 St. Paul St., Brookline, Mass.)
Original application Feb. 5, 1953, Ser. No. 335,381, now Patent No. 2,833,942, dated May 6, 1958. Divided and this application Feb. 18, 1958, Ser. No. 715,946
2 Claims. (Cl. 29—155.5)

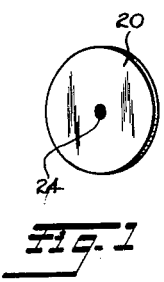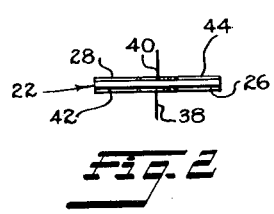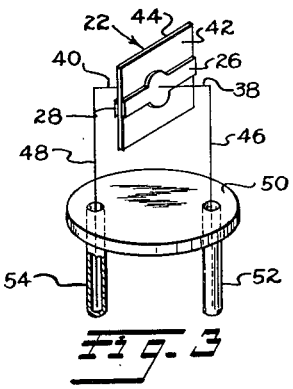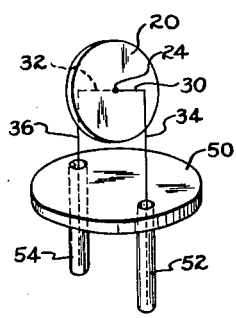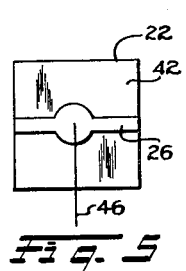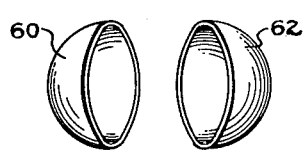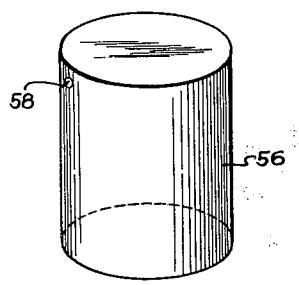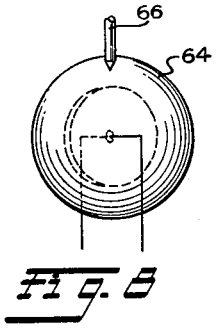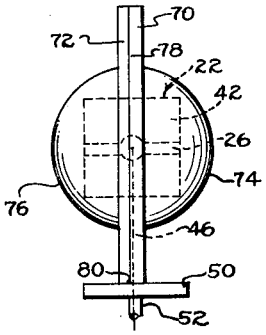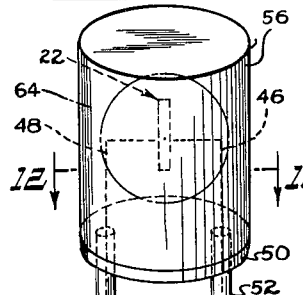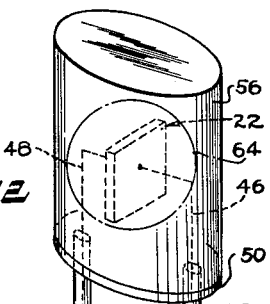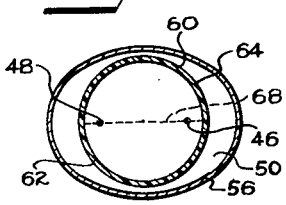
INVENTOR
LEONARD E. RAVICH
BY
ATTORNEYS Sept. 4, 1962 L. E. RAVICH 3,052,012
METHODS OF MAKING CONTAMINANT-PROOF ELECTRICAL CIRCUIT COMPONENTS
Original Filed Feb. 5, 1953 2 Sheets-Sheet 2
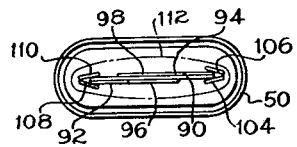
Fig. 14
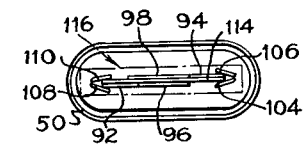
Fig. 16
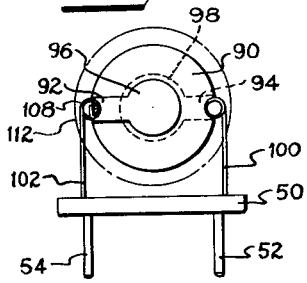
Fig. 13
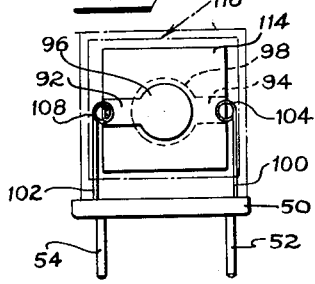
Fig. 15
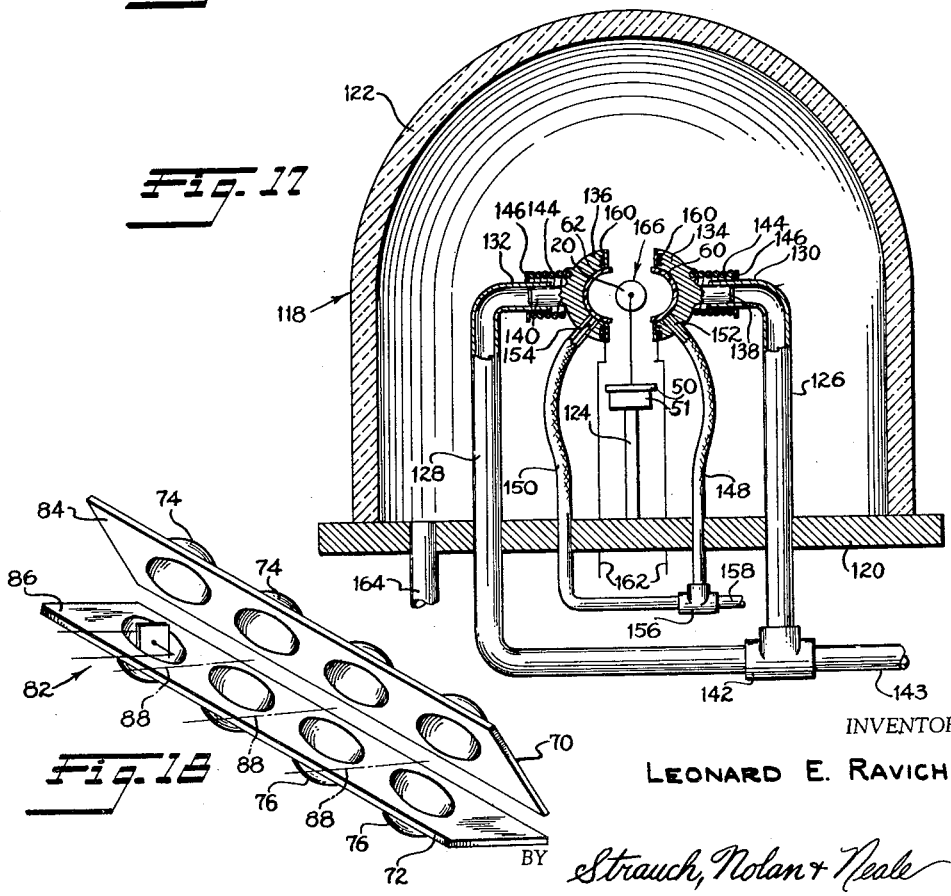
Fig. 17
Fig. 18
INVENTOR
LEONARD E. RAVICH
BY Strauch, Nolan & Neale
ATTORNEYS United States Patent Office 3,052,012
Patented Sept. 4, 1962

This invention relates to improvements in electrical circuit components and more particularly to improvements in the protection of such components from extraneous influences such as atmosphere conditions or substances which would modify the electrical characteristics of such components.

This application is a division of my co-pending application Serial No. 335,381 filed February 5, 1953, now Patent No. 2,833,942.

In the use of many delicate electrical circuit components such as crystalline structures, printed circuits, and the like it is necessary to maintain such components as free as possible of any contaminants which might settle or collect on the component and affect its accuracy of operation by changing its normal operating characteristics. I have invented an improved structure for protecting such components from contamination and the method of making such structures, which I will describe by way of example in connection with frequency control crystals for electronic devices. While such crystals are in fact accurately cut crystal fragments, they will be referred to herein as crystals in view of the general use of that term for that purpose in the industry. The structure and method herein described is, however, equally applicable to printed circuits, transistors, photo-transistors, thermal responsive transistors, crystalline rectifiers and other electrical circuit components the operating characteristics of which could be modified by an accumulation of extraneous material thereon, in handling during manufacturing, assembly, shipping, or operating procedures, or by atmospheric conditions such as temperature and humidity.

Frequency control crystals as used in radio and electronic devices usually comprise a quartz crystal fragment operatively connected by silver contact points, provided thereon, to a pair of spaced electrodes, such that the crystal is held in a suspended relation between the electrodes. The electrodes may in turn be secured, as by soldering, to a pair of hollow pins or mounting legs which are rigidly secured in a glass, porcelain or other insulating base and which, when the unit is plugged into a complementary socket, form a support for the crystal unit as well as electrical connections to the crystal. A metallic protective cover or can encircles the suspended quartz crystal and in past practice is secured in airtight relation to the base to form an airtight chamber for the suspended crystals. In prior art devices the can was evacuated through a suitable aperture provided therein, filled with an inert gas such as nitrogen, and then sealed thus forming an inert atmosphere enveloping the crystal.

After the inert atmosphere has been created in the container or can the crystal is given a final test for its frequency characteristics to ascertain whether such characteristics have been modified by its mounting within the container.

It is essential in such devices that the operating characteristics of the crystal remain the same such that there will be no variation in the frequency characteristics under widely divergent operating conditions, as might be encountered for example in installations of military equipment that may be used in either the polar regions or tropics. Experience has shown that the deposit of even minute amounts of a foreign substance on a crystal or slight variations in atmospheric conditions materially affects the frequency characteristics of the crystal during its operation. For this reason, military specifications are particularly rigid in its requirements of operation of such apparatus.

The structure and assembling techniques heretofore known in the art have not been wholly satisfactory and, even though minute, such foreign substances as grease, oil, soldering flux residue, inorganic or organic salts and other contaminants frequently have been deposited on the quartz crystals during assembly handling or the crystal has been effected by temperature or humidity. Additionally, if any of the aforementioned contaminants are present within the container the vibration of the crystal and the heat subsequently produced will cause a migration of the foreign matter onto the crystal surface thus changing its frequency output.

By the very nature of prior art devices such contaminated conditions are not determinable any earlier than final test of the unit after the cover has been placed over the crystal and secured to the base, and oftentimes such conditions do not manifest themselves until the units have been installed in the field. Consequently, there have heretofore been a restrictively high number of units rejected in final test because they do not meet the rigid specifications, and a commensurately high number of units have been discarded in the field because they manifested, at such later time, a contaminated condition. As a result, manufacturing costs have been exorbitantly high and the number of satisfactory units produced has heretofore been extremely low.

The present invention contemplates a novel shield for electrical circuit components and the method of producing such shield which will give a completely satisfactory unit and which will permit the final testing of the circuit component before the final or complete assembly of the units for field use.

This novel structure contemplates the enveloping of the circuit component in a small hollow shield or bubble structure that is then evacuated or filled with an inert gas to provide an inert atmosphere. The metallic cover which heretofore served the dual purpose of a protective cover and a means for maintaining an evacuated or inert atmosphere around the circuit components serves only as a cover in my novel structure. As a result, the crystals can be fully tested before securing them to a mounting base or before the covers are ever assembled thereon. This feature reduces the hazards of contaminants on the cover, on the hands of the assembler, or in the materials used to assemble the covers from ever contacting the crystals, thereby assuring a greater quantity of crystals capable of meeting the rigid operational specifications, materially reduces the cost of producing such crystals, and lessens the number of operations necessary before final testing of the crystals is possible.

It is therefore a major object of this invention to provide an improved structure for protecting contaminant sensitive circuit components from sources of contamination;

Another object of this invention is to provide an improved shield for encasing and protecting contaminant sensitive circuit components in a contaminant free atmosphere and methods of producing such shield;

A further object of this invention is to provide a contaminant sensitive circuit component, such as a crystal, which is supported between delicate spaced electrodes with a protective airtight hollow plastic shield or bubble for protecting the crystal from contaminants and to provide methods of forming such a plastic shield;

And another object of this invention is to provide a novel hollow shield or bubble for suspending electronic crystals therein and novel means for creating an inert atmosphere within the bubble.

These and other objects will appear from the following description and appended claims when read in connection with the attached drawing, wherein;

FIGURE 1 is an enlarged perspective view of a standard disc-shaped crystal showing one of the silver contacts for the mounting of the electrodes;

FIGURE 2 is a top plan view of a standard rectangular shaped crystal showing in enlarged form silver contact strips for mounting of the electrodes;

FIGURE 3 is an enlarged perspective view partially in section showing a rectangular crystal with electrodes secured to a mounting base;

FIGURE 4 is an enlarged perspective view showing a disc crystal with electrodes secured to a mounting base;

FIGURE 5 is a front elevational view of the crystal shown in FIGURE 2;

FIGURE 6 is an enlarged perspective view of two halves of one form of shield or bubble;

FIGURE 7 is a perspective view of the metallic cover;

FIGURE 8 is an enlarged perspective view showing a disc shaped crystal encased by a shield or bubble and showing an evacuating needle extending into the bubble;

FIGURE 9 is a side elevational view of a rectangular shaped crystal encased in a modified form of shield or bubble;

FIGURE 10 is a front perspective view of a completely assembled unit illustrating the cover and showing the shield encased crystal in phantom lines;

FIGURE 11 is a three-quarter perspective view of the assembly shown in FIGURE 10;

FIGURE 12 is a sectional view taken substantially along the line 12—12 of FIGURE 10;

FIGURE 13 is a front elevational view of a disc type crystal showing a modified silver contact, modified means of securing the electrodes to the contacts, and a modified protective cocoon;

FIGURE 14 is a top plan view of the crystal shown in FIGURE 13 showing the oval shape of the modified cocoon;

FIGURE 15 is a front elevational view of a rectangular type crystal showing similar contacts and electrode securing means as shown in FIGURE 13 and further showing a rectangularly shaped protective cocoon;

FIGURE 16 is a top plan view of the crystal shown in FIGURE 15 showing the rectangular shape of the cocoon;

FIGURE 17 is a vertical sectional view of exemplary apparatus used in the method of assembling the protective cocoons in an inert atmosphere; and FIGURE 18 is a perspective view showing the mass strip production of the form of protective cocoon shown in FIGURE 9.

Referring now to FIGURES 1 and 2 there is shown two types of standard frequency control quartz crystals widely used in electronic devices. Numeral 20 indicates a disc type crystal and 22 indicates a standard rectangular shaped crystal. As is clearly seen in FIGURE 1, disc 20 is provided with an electrode mounting point 24 of silver solder. A similar contact point is mounted on the opposite side of the disc spaced from contact point 24 by the intervening quartz crystal 20. In the crystalline structure shown in FIGURES 2 and 5 the silver contact points comprise silver solder strips 26 and 28 disposed on opposite sides of crystal body 22. The silver contact points or strips, which may be applied to either crystal body 20 or 22 by an evaporation process, while serving as a mounting point add weight to the crystals to modify its frequency characteristics. In the case of disc type crystal 20, as clearly seen in FIGURE 4, electrodes 30 and 32 are respectively secured to the silver contacts on opposite sides at the exact center of the disc by suitable means, such as soldering. Electrodes 30 and 32 extend perpendicularly outwardly from their respective faces a short distance and are then bent at right angles to have vertically downwardly extending legs 34 and 36, respectively. As clearly seen in FIGURE 3 electrodes 38 and 40 are similarly secured to silver strips 26 and 28 at the exact center of side faces 42 and 44 and extend perpendicularly outwardly therefrom and then are bent into vertically downwardly disposed legs 46 and 48.

In the case of either the disc or rectangular type of crystal the mounting structure for the crystal preferably comprises a base 50 of porcelain, glass, or other suitable material, in which there is provided a pair of spaced apertures for rigidly mounting, by suitable means, a pair of hollow mounting contact pins or prongs 52 and 54. Electrode legs 46 and 48 are inserted into hollow pins 52 and 54, respectively, and rigidly secured therein as by soldering.

The foregoing has been the known and conventional method of assembling such crystals. At this point in prior art devices a metallic cover 56, such as is shown in FIGURE 7 was secured to base 50 and evacuated through aperture 58 to form an inert atmosphere around the crystal. As heretofore noted such structure and methods of assembly exposed the crystal to the deposit of foreign substances, which it is the purpose of the present invention to obviate, both prior to and during the attachment of and modification of the atmosphere within the cover 56.

Referring to FIGURE 6 there is shown two exactly similar hemispheres 60 and 62 formed of a suitable electrical insulating material such as an insulating plastic however it is to be noted that any desired shapes may be employed. Hemispheres 60 and 62 are brought together along their circular bases with the crystal in non-contacting relation with the hemispheres therebetween and with electrode legs 36 and 34 or 46 and 48 extending externally intermediate the two hemispheres to form a unitary cocoon or bubble 64, as clearly seen in FIGURES 8, 10 and 11. The edges of the two hemispheres are fixed together in sealed relation by suitable means such as direct or inductive heat, by pressure adhesives, or by any suitable means. The sealing together of the hemispheres rigidly surrounds and secures the electrode legs therebetween as is clearly seen in FIGURES 8, 9 and 12. By this construction, the circuit component is suspended within the hollow space formed by the joined hemispheres. After hemispheres 60 and 62 are sealed together in fluid tight relation, a heated hollow needle 66 may be inserted through a side of the cocoon or bubble into the chamber joined by the hemispheres to permit evacuation of the chamber and/or for the filling of the chamber with an inert gas, such as nitrogen. The needle is maintained hot so that as it is withdrawn the bubble in the vicinity of the needle is in a plastic condition and will immediately seal the opening made by the needle, thus completely sealing the crystal in a controlled atmosphere within the shield or bubble.

Since the hemispheres are kept completely clean and, since no fluxes or solders are used to join them, or to seal the opening through which the chamber is evacuated the possibility of foreign deposits contacting the circuit component are immensely minimized.

As heretofore noted the hemispheres are preferably formed of plastic insulating material which contains no volatile matter. By containing no volatile matter, I mean a material which is not volatile at temperatures and conditions which will be experienced during intended operation. A material which I have found to be ideally suited is a plastic composition known as Mylar and manufactured by the Dupont Chemical Company. Chemically this material is polyethylene glycol terephthalate and is available in sheets varying in thickness from ¼ mil to 7 mils, and is easily formed into the desired hemispheres by well-known molding methods. This material is completely flexible at temperatures varying from −60 degrees centigrade to plus 150 degrees centigrade and has an extremely low vapor pressure making it ideally suited for installations that may have use in either polar or tropic regions. As a result when this material is formed into a protective hollow shield for the circuit component, neither the evacuation procedure of the cocoon nor the slight amount of heat which may be present in the component unit will cause any contamination of the crystal from materials in the plastic such as plasticizers. This is extremely important since it is essential to perfect operation, as heretofore noted, that the components such as crystals be kept clean or uncontaminated.

After the shield or bubble, formed by hemispheres 60 and 62, has been sealed the crystal can be finally tested for its frequency characteristics. The structure of this novel invention by-passes the necessity of securing the electrodes to base 50 or securing covering 56 to base 50 and the necessary soldering steps which heretofore were necessary to test the crystal and which exposed the crystal to the foreign substances involved in this operation, thereby multiplying the chances of contaminating the crystal.

Once the crystal or electrical circuit component has passed or met the test requirements, protective cover 56 is placed over the shielded crystal unit, as clearly seen in FIGURES 10 and 11, to fit closely around the periphery of base 50 to which it is secured, by suitable means. It is unnecessary of course with my novel invention to have an airtight seal between base 50 and cover 56 since the cover is not needed to maintain an inert atmosphere around the electrical circuit component, but merely forms a protective covering.

Referring to FIGURE 12 there is shown a sectional view taken substantially along the line 12—12 of FIGURE 10. As clearly seen in this figure the sealing of the two hemispheres 60 and 62 along parting line 63 causes the edges of the two hemispheres to firmly and sealingly engage the electrode legs 46 and 48 (or 34 and 36) therebetween to form a support to hold the bubble or shield 64 in spaced relation to the crystal or electrical component suspended therein.

Turning now to FIGURE 9 there is shown a modified form of shield or bubble comprising a pair of rectangular sheet 70 and 72 of plastic or other suitable material. Hemispheres or bubbles 74 and 76 are molded into the center of sheets 70 and 72, respectively, as clearly seen in FIGURE 9, with a planar surface of the sheets surrounding the bubbles. Like hemispheres 60 and 62, sheets 70 and 72 are brought together and sealed along their flat faces, as indicated by parting line 78 to form an airtight chamber about crystal 22. The electrode legs 46 and 48 (or 34 and 36) extend through the planar portion of the sheets and protrude from an edge 80 thereof to permit mounting in pins 52 and 54. In this form of shield or bubble, the edge 80 of the joined sheets may rest on the upper surface of base 50 and the portion of the electrodes between the upper surface 50 and the shield are completely enveloped between sheets 70 and 72 thus affording better support and protection for the delicate electrodes. Additionally this form of shield affords excellent adaptability to mass production techniques since long sheets having these depressed portions or spaced bubbles can be produced, as is clearly seen in FIGURE 18. As seen in FIGURE 18 sheets 70 and 72 are long continuous strips having spaced bubbles 74 and 76 respectively. An electrical circuit component unit such as a crystal provided with electrodes and with or without a mounting base is positioned between each opposed pair of concavities as indicated generally at 82 and faces 84 and 86 are brought together and sealed. After sheets 70 and 72 are sealed together the sheets are cut along lines 88 to separate the sealed units to permit further operations upon the individual assemblies.

Referring now to FIGURES 13 through 15 there is shown further modifications of crystal with modified contact points, modified electrode securing means, and a further embodiment of the protective cocoon or shield.

As clearly seen in FIGURE 13 disc crystal 90 is provided with silver contact strips 92 and 94 on opposite sides of the disc and extending toward the center of the disc where they terminate in circular portions 96 and 98, respectively. These strips are preferably formed on the disc by means of the aforementioned evaporation process. Electrodes 100 and 102 are each formed at one end with double loops 104 and 106 and 108 and 110, respectively as best seen in FIGURE 14. Crystal 90 is inserted between these loops with the loops gripping the crystal and a respective silver contact point, much like the manner of a paper clip. A small portion of silver solder secures one of the loops of each electrode to its associated silver contact strip to positively secure the electrodes and crystal together. As clearly seen in FIGURE 14 the cocoon 112 shown in phantom lines is of ellipsoidal configuration to accommodate the end secured electrodes, however it is to be understood that any suitable form of cocoon can be used just as easily.

Referring to FIGURES 15 and 16 the contact strips and electrode mounting illustrated in FIGURE 13 are shown applied to a rectangular crystal 114, similar numerals indicating similar parts. In FIGURES 15 and 16 a strip type cocoon similar to that illustrated in FIGURES 9 and 18 is shown applied to crystal 114, however in this form the depressed portion or bubble is shown as a rectangle, generally indicated 116, however, here again it should be noted that any desired shape of bubble is possible.

The shield or bubble can also be formed directly around the component by mounting the electrode suspended crystal on a suitable fixture and extruding a tubular shield in spaced relation around the component and then sealingly crimping the tube about the electrodes for support and at the opposite end to form a fluid tight hollow shield around the component.

The evacuation procedure of the hollow bubbles or shields can be accomplished by methods other than using hollowing heated needle 66. A preferred method is to assemble the shield upon the circuit component in a chamber in which the atmosphere conditions may be controlled by either the evacuation of the chamber or by providing an inert atmosphere. Illustrative apparatus for so assembling the units is shown in FIGURE 17.

Numeral 118 generally indicates a well-known bell jar apparatus, for providing a chamber in which the atmosphere may be controlled. The apparatus comprises a base 120 and a glass bell jar 122. Stand 124 is mounted at the near center of the base and is provided at its top with a mounting fitting 51 having a pair of spaced openings for receiving mounting pins 52 and 54 of a crystal, which for purposes of illustration is similar to the crystal assembly shown in FIGURE 4. A pair of rigid fluid lines 126 and 128 are mounted in spaced relation on base 120 are bent toward each other at their upper ends as at 130 and 132, respectively. Lines 126 and 128 extend through base 120 and are commonly connected by T-fitting 142 to line 143 which is connected through a control valve to a common source of fluid pressure (not shown). Mounting members 134 and 136 are provided with integral piston portions 138 and 140, respectively, which are received with a smooth sliding fluid tight fit in the bores of portions 130 and 132, respectively. As clearly seen in FIGURES 17, mounting members are mounted so as to never contact crystal 20. For purposes of explanation mounting members 134 and 136 are shown to be of hemispherical configuration for mounting hemispherical bubbles 60 and 62, however, it is to be understood that the shape of the mounting members will be varied for other configurations of cocoons or shields. Tension springs 144 are secured to each mounting member at one end and have their other ends secured to an anchor plate 146 secured to the outer periphery of portions 130 and 132. The normal tension of springs 144 hold mounting members 134 and 136 in their retracted positions, as clearly seen in FIGURE 17. Flexible vacuum lines 148 and 150 are connected at one end to openings 152 and 154 in mounting members 134 and 136 for creating a vacuum within mounting members 134 and 136 to retain hemispherical bubbles 60 and 62 therein. Vacuum lines 148 and 150 extend through base 120 and are commonly connected by fitting 156 to a line 158 from a common vacuum source. Vacuum lines 148 and 150 are flexible to allow for operational movement of mounting members 134 and 136.

Heating elements 160 are circumferentially mounted within each mounting member and are disposed adjacent the face of the base of each mounting member to provide a localized heating for a purpose to be explained. Electrical leads 162 are connected to the heating elements and extend exteriorly of the bell jar to be connected to a source of electrical current.

A standard pipe fitting 164 is provided in base 120 for evacuating or providing an inert atmosphere within the interior chamber of bell jar 118 in the well-known manner.

In operation, hemispheres 60 and 62 are placed in mounting members 134 and 136, respectively, and are held therein by a suction acting on the surface of the hemispheres created by the vacuum in lines 148 and 150. A crystal assembly, generally designated 166, is mounted on stand 124 so that crystal 20 is within a space defined by the peripheries of the hemispheres and the electrodes 34 and 36 are in a plane parallel to the bases of the hemispheres. The interior of bell jar 118 is then evacuated by well-known means through fitting 164 and if desired an inert atmosphere created within the bell jar by subsequent introduction of an inert gas, such as nitrogen. Fluid pressure is then applied through lines 126 and 128 to pistons 138 and 140. This fluid pressure forces the mounting members toward each other and causes the bases of hemispheres 60 and 62 which protrude slightly from the mounting members, as clearly seen in FIGURE 17, to abut each other and also tightly compress electrodes 34 and 36 therebetween. Current is applied to leads 162 to heat elements 160. Since the heating elements are located only at the bases of the mounting members this heating will be locally concentrated to soften the contacting bases of plastic hemispheres. As the opposed faces of the hemispheres are softened fluid pressure will, by moving the mounting members slightly closer together, compress the plastic hemispheres together to form a complete bond. It will be noted from FIGURE 17 that the hemispheres 60 and 62 will never be forced together too much and interfere with crystal 20 since the opposed faces of mounting members 134 and 136 will abut and act as limiting means to the amount of compression placed on hemispheres 60 and 62. Current is then cut off from leads 162 and the heating elements are permitted to cool permitting the joined hemispheres to cool whereby a rigid fluid tight joint is formed and an evacuated or inert atmosphere is maintained about crystal 20. When the joined hemispheres have cooled sufficiently to assure a good bonded joint, fluid pressure is released from lines 126 and 128 to permit springs 144 to separate mounting members 134 and 136. Atmospheric pressure is allowed to enter the bell jar and the assembled crystal and cocoon is then removed, and the procedure repeated for subsequent assemblies.

From the foregoing description it will be seen that I have invented a novel structure and method for protecting delicate crystalline circuit components from contact with any foreign substances which might affect the accuracy of operation of such components. It will also be readily seen that my novel structure and method permit earlier testing of such components, reduce the number of rejected units, reduce the manufacturing costs, and assure greater accuracy and efficient operation.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. The method of constructing a sealed enclosure for electrical circuit component means comprising the steps of providing a pair of thin, non-collapsible sheets of relatively nonvolatile plastic material; forming a non-collapsible blister in at least one sheet in a central position away from the margin of the sheet; mounting said sheets in a face-to-face position together with circuit component means smaller than said blister positioned in the center of the interior spaced from the walls of said blister with electric terminals on said component means extending beyond the margin of said sheets; sealing said sheets together around said blister and along a portion of the length of said electrical terminals to form a gas tight protective enclosure for said component means; piercing the sealed enclosure with a heated needle; producing a controlled atmosphere inside said sealed enclosure; and maintaining the needle hot while withdrawing it so that the material in the vicinity of the needle is in a plastic condition and will immediately seal the opening made by the needle as it is withdrawn.

2. The method of constructing a sealed enclosure for electrical circuit component means comprising the steps of providing a thin sheet of relatively nonvolatile plastic material; molding spaced depressions in said sheet; cutting said sheet between molded depressions thereby forming sections each having at least one depression surrounded by undepressed edge portions; mounting two pieces of said plastic material, at least one of which is a sheet section having a molded depression, together with circuit component means positioned in the interior of the molded depression with electrical terminals on said component means extending beyond the edge portion of said section; sealing the undepressed edge portions of said pieces together around said depression to form a gas tight protective enclosure for said component means; piercing the sealed enclosure with a heated needle; producing a controlled atmosphere inside said sealed enclosure; and maintaining the needle hot while withdrawing it so that the material in the vicinity of the needle is in a plastic condition and will immediately seal the opening made by the needle as it is withdrawn.

References Cited in the file of this patent

UNITED STATES PATENTS

| | | |
|---|---|---|
| 1,387,805 | Roberts | Aug. 16, 1921 |
| 1,713,755 | Gibson | May 21, 1929 |
| 2,266,070 | Pierce | Dec. 16, 1941 |
| 2,486,758 | Pfeiffer | Nov. 1, 1949 |
| 2,615,565 | Bower et al. | Oct. 28, 1952 |
| 2,704,880 | Brennan | Mar. 29, 1955 |
| 2,893,182 | Pies | July 7, 1959 |